United States Patent
Lomax, Jr. et al.

(10) Patent No.: US 8,034,164 B2
(45) Date of Patent: Oct. 11, 2011

(54) METHODS AND APPARATUS FOR IMPROVED CONTROL OF PSA FLOW VARIATIONS

(75) Inventors: Franklin D. Lomax, Jr., Boyds, MD (US); John S. Lettow, Washington, DC (US)

(73) Assignee: Lummus Technology Inc., Bloomfield, NJ (US)

( * ) Notice: Subject to any disclaimer, the term of this patent is extended or adjusted under 35 U.S.C. 154(b) by 264 days.

(21) Appl. No.: 12/239,383

(22) Filed: Sep. 26, 2008

(65) Prior Publication Data

US 2009/0020014 A1    Jan. 22, 2009

Related U.S. Application Data

(62) Division of application No. 11/330,084, filed on Jan. 12, 2006, now Pat. No. 7,641,716.

(60) Provisional application No. 60/642,989, filed on Jan. 12, 2005.

(51) Int. Cl.
    *B01D 53/047* (2006.01)
(52) U.S. Cl. ............................. 95/121; 96/152; 138/40
(58) Field of Classification Search .................. 96/115, 96/121, 152; 95/96; 137/8; 138/40, 41, 138/44
    See application file for complete search history.

(56) References Cited

U.S. PATENT DOCUMENTS

| | | | | |
|---|---|---|---|---|
| 2,975,860 A | * | 3/1961 | Westeren | 96/126 |
| 3,636,679 A | | 1/1972 | Batta | |
| 4,022,238 A | * | 5/1977 | Nordentoft | 137/98 |
| 4,041,982 A | * | 8/1977 | Lindner | 137/625.3 |
| 4,761,165 A | * | 8/1988 | Stocker et al. | 95/22 |
| 4,910,007 A | | 3/1990 | Pinto et al. | |
| 4,995,949 A | * | 2/1991 | Rhoades | 205/118 |
| 5,341,848 A | * | 8/1994 | Laws | 138/44 |
| 5,411,578 A | * | 5/1995 | Watson et al. | 95/101 |
| 5,588,635 A | * | 12/1996 | Hartman | 251/127 |
| 5,656,065 A | * | 8/1997 | Kalbassi et al. | 95/96 |
| 5,656,068 A | | 8/1997 | Smolarek et al. | |
| 5,871,564 A | * | 2/1999 | McCombs | 95/98 |

(Continued)

FOREIGN PATENT DOCUMENTS

DE          43 24 526        1/1995

(Continued)

OTHER PUBLICATIONS

Search Report issued Jan. 19, 2011, in European Patent Application No. 06718043.0, filed Jan. 12, 2006.

*Primary Examiner* — Frank Lawrence, Jr.

(74) *Attorney, Agent, or Firm* — Alix, Yale & Ristas, LLP

(57) ABSTRACT

A pressure swing adsorption process including the step of separating a gas mixture by absorbing at least one gas component in an adsorbent mass provided within each vessel of a plurality of vessels. The separating step has a single pressure equalization cycle. The separating step is preferably performed with only four valves per vessel of the plurality of vessels. Additionally, a pressure swing adsorption system of the invention includes a plurality of vessels each containing therein an adsorbent mass configured to separate a gas mixture by absorbing at least one gas component in said adsorbent mass, where the system is configured to separate the gas mixture using a single pressure equalization cycle and includes only four valves per vessel of the plurality of vessels.

43 Claims, 7 Drawing Sheets

U.S. PATENT DOCUMENTS

| | | | |
|---|---|---|---|
| 5,928,407 A * | 7/1999 | Amlinger | 95/21 |
| 5,964,924 A * | 10/1999 | Engler et al. | 95/98 |
| 5,997,612 A * | 12/1999 | Doong | 95/101 |
| 6,017,382 A * | 1/2000 | Ji et al. | 95/103 |
| 6,146,450 A * | 11/2000 | Duhayer et al. | 96/130 |
| 6,475,265 B1 | 11/2002 | Baksh et al. | |
| 6,497,856 B1 | 12/2002 | Lomax et al. | |
| 6,623,719 B2 | 9/2003 | Lomax et al. | |
| 6,755,895 B2 | 6/2004 | Lomax, Jr. et al. | |
| 7,051,765 B1 * | 5/2006 | Kelley et al. | 138/44 |
| 7,445,660 B2 * | 11/2008 | Hart et al. | 95/26 |
| 2002/0014159 A1 * | 2/2002 | Tatsumi et al. | 96/130 |
| 2002/0029691 A1 * | 3/2002 | McCombs et al. | 95/96 |
| 2003/0167924 A1 * | 9/2003 | McCombs et al. | 96/121 |
| 2005/0097819 A1 | 5/2005 | Lomax et al. | |

FOREIGN PATENT DOCUMENTS

| | | |
|---|---|---|
| DE | 195 03 007 | 8/1996 |

* cited by examiner

Figure 2

| Vessel | time step | | | | | | | |
|---|---|---|---|---|---|---|---|---|
| | 1 | 2 | 3 | 4 | 5 | 6 | 7 | 8 |
| 10 | A | Ed | PP | BD | P | Ep | FP | A |
| 20 | PP | BD | P | Ep | FP | A | A | Ed |
| 30 | FP | A | A | Ed | PP | BD | P | Ep |
| 40 | PP | Ep | FP | A | A | Ed | PP | BD |

Figure 4

| Vessel | Time step | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | A3 | A4 | Ed1 | Ed2 | PP1 | PP2 | BD1 | BD2 | P1 | P2 | Ep1 | Ep2 | FP1 | FP2 | A1 | A2 |
| 2 | PP1 | PP2 | BD1 | BD2 | P1 | P2 | Ep1 | Ep2 | FP1 | FP2 | A1 | A2 | A3 | A4 | Ed1 | Ed2 |
| 3 | FP1 | FP2 | A1 | A2 | A3 | A4 | Ed1 | Ed2 | PP1 | PP2 | BD1 | BD2 | P1 | P2 | Ep1 | Ep2 |
| 4 | P1 | P2 | Ep1 | Ep2 | FP1 | FP2 | A1 | A2 | A3 | A4 | Ed1 | Ed2 | PP1 | PP2 | BD1 | BD2 |
| 5 | BD2 | P1 | P2 | A1 | A2 | A3 | A4 | Ed1 | Ed2 | PP1 | PP2 | BD1 | Ed2 | PP1 | PP2 | BD1 |
| 6 | Ep2 | FP1 | FP2 | BD1 | BD2 | P1 | P2 | Ep1 | Ep2 | FP1 | FP2 | A1 | A2 | P1 | P2 | Ep1 |
| 7 | Ed2 | PP1 | PP2 | A4 | Ed1 | Ed2 | PP1 | PP2 | BD1 | BD2 | P1 | P2 | A1 | A2 | A3 | A4 |
| 8 | A2 | A3 | A4 | Ed1 | Ed2 | PP1 | PP2 | BD1 | BD2 | P1 | P2 | Ep1 | Ep2 | FP1 | FP2 | A1 |
| wastegas flow in time step | 2.8 | 3.5 | 4.2 | 3.5 | 2.8 | 3.5 | 4.2 | 3.5 | 2.8 | 3.5 | 4.2 | 3.5 | 2.8 | 3.5 | 4.2 | 3.5 |
| max. # of vessels adsorbing | 2 | 3 | 2 | 3 | 2 | 3 | 2 | 3 | 2 | 3 | 2 | 3 | 2 | 3 | 2 | 3 |

Figure 5

| Vessel | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A3 | A4 | Ed1 | Ed2 | PP1 | PP2 | BD1 | BD2 | P1 | P2 | Ep1 | Ep2 | FP1 | FP2 | A1 | A2 |
| 2 | PP1 | PP2 | BD1 | BD2 | P1 | P2 | Ep1 | Ep2 | FP1 | FP2 | A1 | A2 | A3 | A4 | Ed1 | Ed2 |
| 3 | FP1 | FP2 | A1 | A2 | A3 | A4 | Ed1 | Ed2 | PP1 | PP2 | BD1 | BD2 | P1 | P2 | Ep1 | Ep2 |
| 4 | P1 | P2 | Ep1 | Ep2 | FP1 | FP2 | A1 | A2 | A3 | A4 | Ed1 | Ed2 | PP1 | PP2 | BD1 | BD2 |
| 5 | BD1 | BD2 | P1 | P2 | Ep1 | Ep2 | FP1 | FP2 | A1 | A2 | A3 | A4 | Ed1 | Ed2 | PP1 | PP2 |
| 6 | Ep1 | Ep2 | FP1 | FP2 | A1 | A2 | A3 | A4 | Ed1 | Ed2 | PP1 | PP2 | BD1 | BD2 | P1 | P2 |
| 7 | Ed1 | Ed2 | PP1 | PP2 | BD1 | BD2 | P1 | P2 | Ep1 | Ep2 | FP1 | FP2 | A1 | A2 | A3 | A4 |
| 8 | A1 | A2 | A3 | A4 | Ed1 | Ed2 | PP1 | PP2 | BD1 | BD2 | P1 | P2 | Ep1 | Ep2 | FP1 | FP2 |
| wastegas flow in time step | 4.9 | 2.1 | 4.9 | 2.1 | 4.9 | 2.1 | 4.2 | 2.1 | 4.9 | 2.1 | 4.9 | 2.1 | 4.9 | 2.1 | 4.2 | 2.1 |
| max. # of vessels adsorbing | 2 | 3 | 2 | 3 | 2 | 3 | 2 | 3 | 2 | 3 | 2 | 3 | 2 | 3 | 2 | 3 |

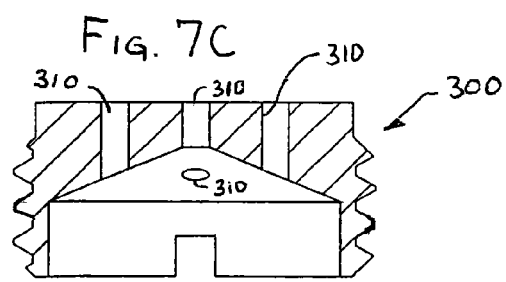
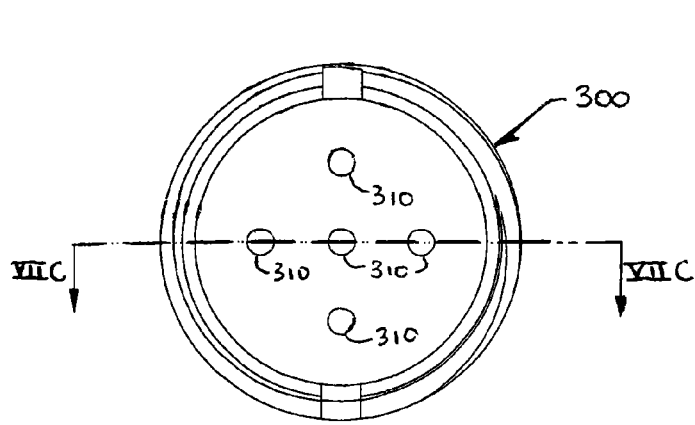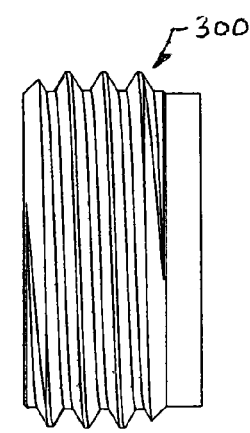
FIG. 7A
FIG. 7B

METHODS AND APPARATUS FOR IMPROVED CONTROL OF PSA FLOW VARIATIONS

CROSS-REFERENCE TO RELATED APPLICATION

The present application is a Divisional of U.S. Ser. No. 11/330,084 filed Jan. 12, 2006, now U.S. Pat. No. 7,641,716, which is based upon provisional application U.S. Ser. No. 60/642,989 filed Jan. 12, 2005, the contents of each of which are incorporated herein by reference.

BACKGROUND OF THE INVENTION

Pressure swing adsorption (PSA) is a commonly used process for the purification of gases. Exemplary applications include separation of hydrogen from gas mixtures, separation of helium from natural gas, purification of landfill gas, and air separation for production of oxygen, nitrogen and/or argon.

Related art PSA systems are limited by their very large product and raffinate gas flow fluctuations. These fluctuations require sizeable storage or surge tanks to dampen the flow fluctuation adequately to allow proper function of downstream process equipment connected to the PSA system.

Industrial-scale gas separations have traditionally been executed using PSA cycles possessing at least one pressure-equalizing step to enhance pressurized product fractional recovery at a given purity. Increased fractional recovery decreases the amount of gas rejected to the raffinate surge tank, and ensures a more nearly continuous flow of pressurized product gas. Cycles having three or more equalizations are known.

Another step taken to reduce flow pulsation in the related art is to operate cycles having many equalizations and many vessels in a single process train. An example of a PSA system having many vessels and many equalization steps is U.S. Pat. No. 3,986,849 to Fuderer et al. which describes process trains possessing as many as ten adsorbent vessels and fifty-five valves. In industrial applications, the high energy and operating costs associated with loss of recoverable product has usually been outweighed by the considerable increase in complexity associated with more complex PSA cycles having one or more pressure equalizations except for very large plants. Thus, most plants employ extremely large surge tanks for both pressurized product and raffinate gas.

Related art PSA systems of all types, but especially those having multiple equalizations, are also subject to severe limitations due to their very high complexity and attendant high parts count. Not only does this complexity significantly increase the probability of a component failure, it also significantly increases the system size, assembly time, and material cost. Most related art PSA systems are single point of failure systems. Notable exceptions are the process revealed in U.S. Pat. No. 4,234,322 to De Meyer et al., and U.S. Pat. No. 6,699,307 by Lomax. Even in the exemplary related art processes, the PSA plant must eventually be shut-down to conduct maintenance on the defective component. Such shutdowns are extremely undesirable as they incur a significant amount of lost production time for the entire process facility. Further, when the PSA is connected to a high temperature process such as a hydrocarbon steam reformer, autothermal reformer, partial oxidation reformer, ammonia synthesis plant or ethylene cracker, the lifetime of the connected process equipment may be greatly reduced due to the high mechanical stresses incurred during a shutdown and restart event.

Keefer et al. describe systems using multiple rotary PSA modules in parallel in U.S. Pat. No. 6,051,050 in order to achieve greater overall system capacity, but do not disclose a method or strategy for operating these modules in the event of malfunction. The rotary modules of Keefer et al. are quite different than those accepted in industrial practice, and are not subject to the same type of single point valve failure as valved PSA apparatus. Their mode of failure is through gradual seal failure. The modules of Keefer also have a very large number of active beds, and they are thus less concerned with variations in product and raffinate gas flowrate pulsation. The low-pulsation rotary modules of Keefer et al., and the similar inventions of U.S. Pat. Nos. 5,112,367, 5,268,021 and 5,366,541 to Hill et al. suffer from inevitable leakage due to their use of sliding seals. This leakage results in reduced purity and product recovery, as well as maintenance problems due to limited seal lifetime. High pressure exacerbates these problems, making rotary modules less desirable for industrially-important separations than the valved PSA apparatuses accepted in the related art.

Because of the extremely large size of related art valved PSA systems and their very high cost, it has remained extremely undesirable to provide backup PSA capacity to prevent process shutdowns, especially for valved PSA systems having pressure equalizations and large numbers of adsorbent beds, with their attendant high complexity The present inventors have previously developed improved apparatuses for advanced PSA systems that greatly reduce the complexity of PSA apparatus employing pressure equalizations in U.S. Pat. No. 6,755,895 (hereafter "the '895 patent"). We have also developed new methods for executing PSA cycles which dramatically-reduce the number of valves required to execute PSA cycles in U.S. Pat. No. 6,699,307 (hereafter "the '307 patent"). We have also developed improved methods of controlling flows of purge and equalization gas in U.S. Pat. No. 6,887,301 (hereafter "the '301 Patent") as well as more advanced PSA apparatus and a novel approach to the use of multiple, modular PSA's to reduce flow variability, manufacturing cost and provide ease of service and fault tolerance in co-pending U.S. Pat. No. 6,918,953 (hereafter "the '953 Patent"). All of these references are incorporated herein by reference in their entirety. Although these inventions all address the shortcomings of related art PSA's, further room for improvement remains.

The novel PSA cycles of the '307 patent are directed at separations benefiting from multiple pressure equalizations, which are generally beneficial in obtaining optimal PSA product recovery for equilibrium separations. Under certain circumstances, however, a single pressure equalization may be preferred to maximize performance. Examples include cases where an unusually-high amount of purge gas is required to strip adsorbed impurities from the adsorbent surface, where the void fraction of the adsorbent mass is low, or where the operating pressure is low. The same situation may arise when the economic value of the purified product is low and the allowable capital cost for the PSA is very low.

The modular PSA method and apparatus of the '953 Patent greatly reduces the flowrate variation of a PSA plant, potentially reducing the required volume of gas storage tanks to buffer this variation, reducing the required size of piping and valving and reducing the total footprint of the PSA plant. It does, however, disadvantageously increase the number of piping connections, structural supports, etc.

SUMMARY OF THE INVENTION

Accordingly, the present invention advantageously provides a pressure swing adsorption system having a single pressure equalization using only four valves per vessel.

The present invention further advantageously provides a pressure swing adsorption apparatus where at least two independent pressure swing adsorption cycles are provided in a single mechanical assembly.

The present invention also advantageously provides a pressure swing adsorption process using two single equalization PSA cycles operated in parallel which reduces the variation in waste gas flowrate.

Furthermore, the present invention advantageously provides a method for optimizing pressure swing adsorption cycles to minimize variation in product and waste gas flowrate either independently or simultaneously.

These and other objects will be made more evident by reference to the figures.

BRIEF DESCRIPTION OF THE FIGURES

A more complete appreciation of the invention and many of the attendant advantages thereof will become readily apparent with reference to the following detailed description, particularly when considered in conjunction with the accompanying drawings, in which:

FIG. 2 is a valve timing diagram for the single-equalization PSA system of FIG. 1;

FIG. 4 is a first embodiment of a valve timing diagram for the parallel single-equalization PSA system of FIG. 3;

FIG. 5 is a second embodiment of a valve timing diagram for the parallel single-equalization PSA system of FIG. 3;

FIG. 7A is a front plan view of a throttling assembly according to the present invention, FIG. 7B is a side view of the throttling assembly of FIG. 7A, and FIG. 7C is a side cross-sectional view of the throttling assembly taken along line VIIC-VIIC in FIG. 7A.

DETAILED DESCRIPTION OF THE INVENTION

Figure 1:
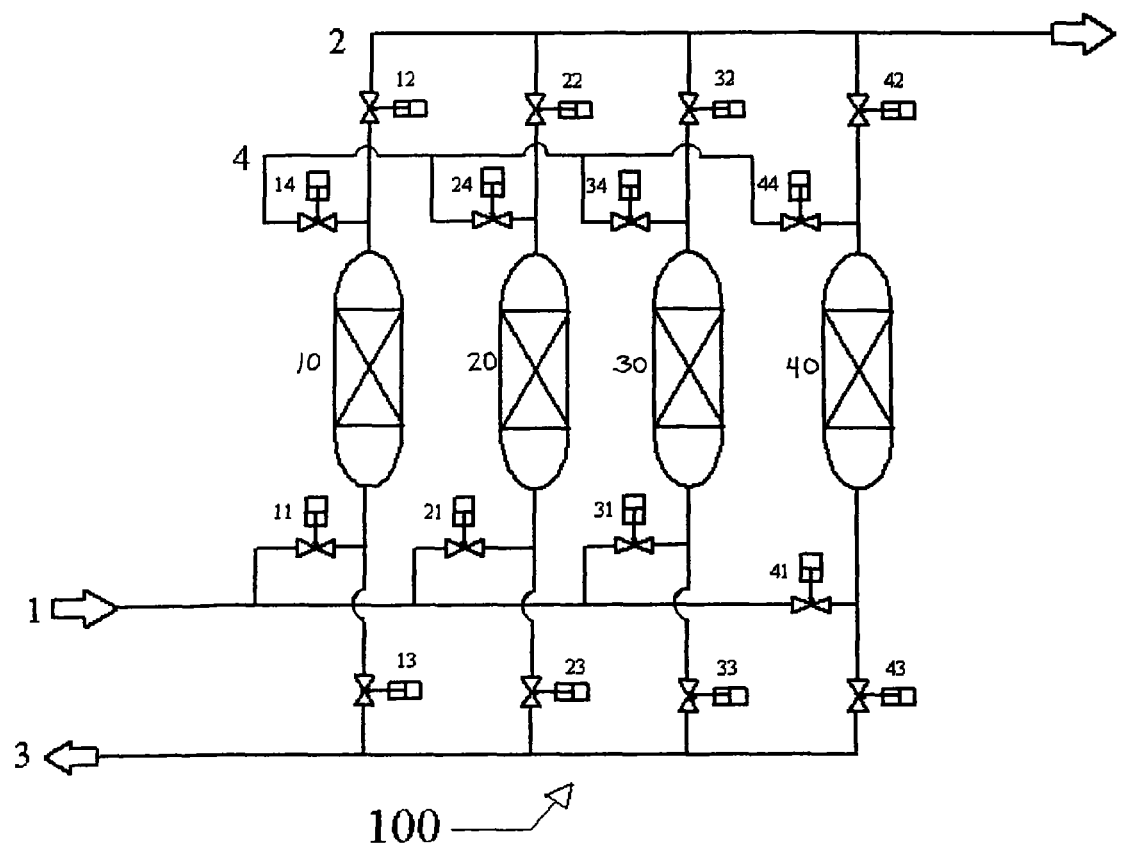
FIG. 1 is a process diagram showing a four vessel PSA system capable of executing a single pressure equalization PSA cycle.

FIG. 1 shows a PSA system 100 having adsorbent vessels 10, 20, 30 and 40. These adsorbent vessels are connected to four parallel flow manifolds, namely a feed manifold 1, a product manifold 2, a waste gas manifold 3 and an equalization and purge manifold 4 according to the practice of the '307 patent. The vessels are provided with corresponding raw gas feed valves 11, 21, 31 and 41, product valves 12, 22, 32, and 42, waste valves 13, 23, 33 and 43 and equalization and purge valves 14, 24, 34 and 44. This mechanical arrangement thus possesses four vessels with four valves each.

The present apparatus may advantageously be used to execute either the valve timing cycle of the '307 patent or the valve timing cycle of FIG. 2. FIG. 2 shows a valve timing cycle divided into eight time segments, where time steps are repeated to effect continuous purification of a desired product gas delivered into parallel product manifold 2 from a mixed feed gas provided in feed manifold 1. FIG. 2 shows that each vessel executes identical process steps shifted in time relative to one another, so only the steps for vessel 10 will be explained in detail. During the first time step, the vessel 10 is in an adsorption step (A) where mixed feed gas valve 11 is open and product valve 12 is also open. Valves 13 and 14 are closed. The impure feed gas travels through the adsorbent mass in vessel 10, which may be provided as a bed of pellets or extrudates, as a solid monolithic mass, as a rolled cloth or paper, as a powder, or by any of the other familiar adsorbent means known in the art. The choice of the adsorbent mass is dictated by the chemistry of the separation and is generally known in the art. The choice of adsorbent mass does not affect the practice of the present invention.

After the first time step, the adsorption is stopped by closing the feed gas valve 11 and the product valve 12. In the manufacture of a substantially pure product gas the adsorption step is stopped before impurities reach the product end of the adsorbent vessel 10. At this point, the void spaces in the adsorbent mass are still filled with valuable pure product gas. This residual pure product is then used in the second time step to repressurize vessel 40. The second time step for the adsorbent vessel 10 is referred to as a pressure equalization step (Ed), where the vessel 10 is depressurized from a first, highest pressure near the feed gas pressure to a second lower pressure and the vessel 40 is pressurized to essentially the same second pressure from a third, lower pressure. During this time step, the feed product and waste valves 11 and 41, 12 and 42 and 13 and 43 of vessel 10 and vessel 40 are in the closed position while the equalization and purge valves 14 and 44 are open.

In the third time step for the adsorbent vessel 10, the vessel 10 begins the process at the second, intermediate pressure with its void spaces still filled by substantially pure product gas. This gas is used to purge vessel 20 of adsorbed impurities. Vessel 20 is at the third, lower pressure during this time step, and the flowrate between vessel 10 and vessel 20 may be controlled by the flow control method of the '301 Patent, by the use of orifice plates, or by the provision of valves 14 and 24 with suitably-restrictive orifices to affect the desired flow control. During this time step the valves 14 and 24 are open to transfer the purge gas to vessel 20 and waste valve 23 is open to allow the purge gas and the purged impurities to flow to the waste manifold 3. All other valves for these two vessels are closed during the provide purge step (pp) of time step 3 for vessel 10.

After the provide purge step in time step 3, the vessel 10 is at a fourth intermediate pressure between the second pressure and the lowest third pressure. The gas in the void space is still substantially-pure. This gas is released to the waste manifold 3 by opening valve 13 while all other valves for vessel 10 are closed in a fourth step for vessel 10 referred to as a blowdown step (BD). This step brings the pressure in vessel 10 at or near the third, lowest pressure. At the end of the fourth time step, purge gas is provided from vessel 30 to vessel 10 through valves 34 and 14 and is conveyed to the waste manifold along with the purged impurity gases by valve 13 to provide a purge step (P) for vessel 10. At the end of time step five, the vessel 10 is purged of impurities and is at the third, lowest pressure.

During time step six, pure gas from vessel 40 is used to repressurize the vessel 10 in a pressure equalization step (EP). In this case, the valves 14 and 44 are open and the other valves for these vessels are closed. This step brings the vessel 10 to the second, intermediate pressure.

Before adsorption begins again, it may be desirable to perform a step of final repressurization (FP) of the vessel 10 using pure product gas from the product gas manifold. This occurs in time step seven by opening the product valve 12 while all other valves for vessel 10 are closed. Variations on this are possible where some repressurization by means of mixed feed gas is used. The use of pressurization by feed gas does not affect the practice of the present invention.

In the eight time step adsorption (A) is started again by admitting mixed feed gas through valve 11 and delivering product through valve 12. It is evident from the forgoing discussion that the exact pressure levels between stages may be adjusted according to the practices known in the art. Further, it is also possible to execute a two pressure equalization PSA cycle according to the '307 cycle using the same apparatus.

Figure 3:
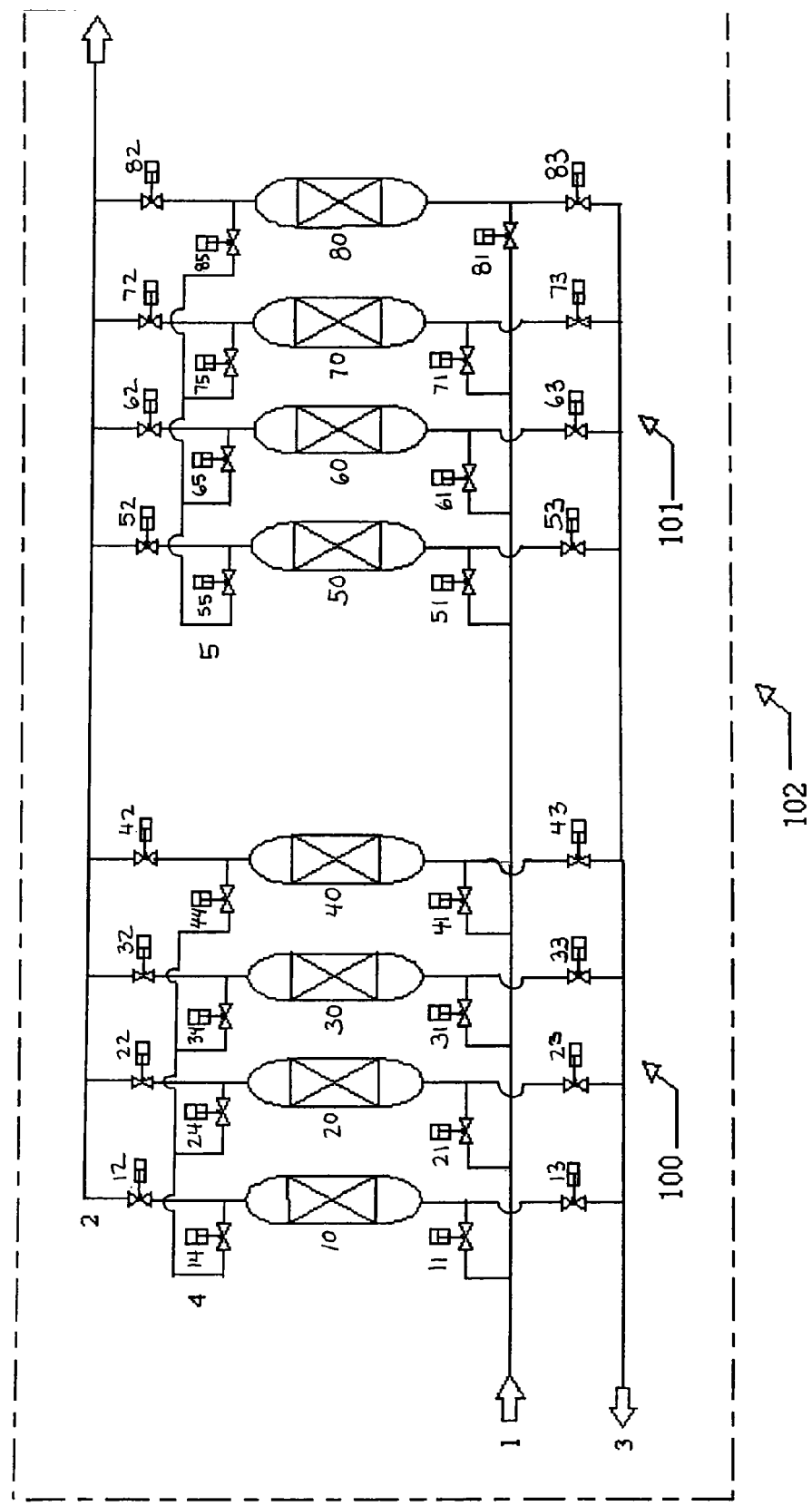
FIG. 3 is a process diagram showing a PSA with two single equalization PSA systems operating in parallel.
Figure 6:
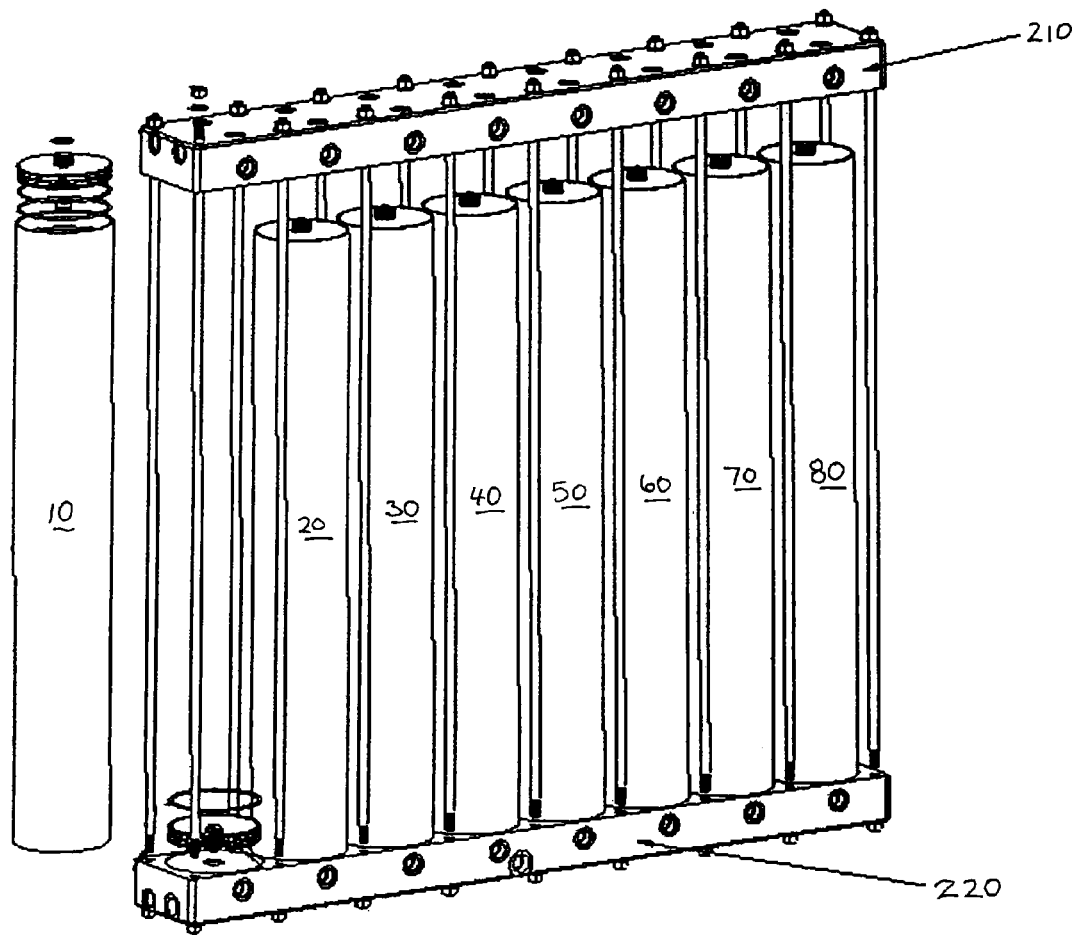
FIG. 6 is an isometric view of a PSA apparatus for executing the process of FIG. 3.

FIG. 3 shows an improved PSA system using the PSA system 100 of FIG. 1 in combination with a second, identical PSA 101. The vessels of the PSA cycle 101 are denoted 50, 60, 70 and 80 and their respective valves are numbered as for the PSA 100. It is notable that the two PSA's are connected via a common feed manifold 1, product manifold 2 and waste manifold 3, but have separate equalization and purge manifolds 4 and 5. Thus, these two PSA's 100 and 101 can be operated as separate PSA modules according to the methods of the '953 Patent. However, in the present invention they are combined into a single mechanical assembly 102. This assembly is shown in FIG. 6. By combining at least two PSA modules into a single mechanical assembly 102, the number of fittings and pipes are advantageously reduced. Further, the number of machined or otherwise formed features to accept these elements is likewise reduced. Further, the required size and weight of the combined apparatus is advantageously reduced while its mechanical strength is increased and its need for mechanical support structures is advantageously reduced.

FIG. 4 shows an embodiment of a valve timing cycle using the two-module PSA of FIG. 3. This valve timing diagram is further divided into sixteen time steps such that each of the time steps of FIG. 2 results in two time steps in FIG. 4. Thus the provide purge step become PP1 and PP2 and the final pressurization step become FP1 and FP2. In FIG. 4 the PSA cycle for PSA 101 is offset from the PSA cycle 100 by two time steps, which is identical to offset by one time step in the eight-step cycle of FIG. 2. For the purpose of greater understanding of the relative reduction in flow variation we have added a row of waste gas flowrate values and the maximum number of adsorbent vessels which may be adsorbing to FIG. 4. For the waste gas flowrate we assume an example PSA which has the following flowrates for each step which produces waste gas. PP1 provides 2.1 units of gas, PP2 provides 1.4 units of gas, BD1 provides 2.8 units of gas and BD2 provides 0.7 units of gas. The sum of the wastegas released for each time step is shown in FIG. 4 for that valve cycle. The maximum number of adsorbent vessels includes adsorption during FP2, as the final pressurization can be very rapid under some conditions, and the time period FP2 may be available for adsorption, thus reducing the flowrate and improving the separation of the desired product from the undesired components of the mixed feed gas. The use of FP2 as an adsorption step is wholly optional, and does not affect the practice of the present invention.

Another valve timing cycle embodiment is shown in FIG. 5, which is also provided with waste gas flowrates and the number of vessels adsorbing. The time cycle for the PSA 100 is offset by one of the sixteen time steps from the PSA cycle for the PSA 100 in the embodiment of FIG. 5. For the example PSA waste gas flows listed above, the table below summarizes the variability in the waste gas flow between the embodiment of FIG. 4, FIG. 5, and the case where both PSA cycles are operated in unison. This table shows that the embodiment of FIG. 4 reduces both the peak waste gas flowrate and the variability in waste gas flowrate compared to operating both PSA modules synchronously as in the '953 Patent. Further, the minimum flowrate is also advantageously increased compared to the synchronous operation. This advantage is to be expected from the teachings of the '953 Patent, and holds true for the particular embodiment having two single equalization modules in combination here.

The table shows that by dividing the valve timing into twice as many distinct time steps and offsetting the cycles by a single time step as in the timing cycle of FIG. 5, the variability is further reduced by a substantial margin. This is accompanied by further substantial reductions in the maximum waste gas flowrate and an increase in minimum waste gas flowrate. These changes correspondingly reduce the need to provide buffer storage reservoir capacity to reduce flowrate and/or flow pressure variations. They also advantageously allow the waste gas manifolds and valve orifices to be reduced in size for the same allowable peak pressure loss.

| | Maximum flowrate per time step | Minimum flowrate per time step | ratio between maximum and minimum flowrate |
|---|---|---|---|
| parallel operation with identical cycle timing | 5.6 | 1.4 | 4 |
| parallel operation with cycle timing offset one time step | 4.2 | 2.8 | 1.5 |
| parallel operation with cycle timing offset two time steps | 4.9 | 2.1 | 2.33 |

The duration of the time steps can be equal or unequal. This can change the flowrates in the time step from those used in the example based of sixteen equal time steps. Indeed, the PSA valve timing cycle can be divided into a greater number of time steps in order to conduct optimization. Additionally, the valve timing could be optimized for waste gas composition instead of waste gas flowrate, or in fact could be optimized instead for product flowrate. More generally, the discrete valve timing cycle gives rise to a time function for each PSA variable such as waste gas flow, waste gas concentration of a species, product gas flowrate, etc. These time functions are essentially-continuous except very near valve opening and closing events. These functions may be integrated and differentiated using the normal mathematical functions. For the purpose of these functions it is useful to consider the total period of the PSA cycles in polar coordinates as $2\pi$ radians, i.e. a complete cycle or circle. Thus, in the sixteen time step PSA cycle having equal time steps in FIG. 5, vessel ten is beginning the purge step at the position $\pi$ radians in the cycle.

Accordingly, we have found that combinations of at least two PSA cycles may be operated with a phase angle between their valve timing. In the example of FIG. 4 with sixteen equal time steps in the cycle and a phase angle of two steps this phase angle has a value in the polar coordinates of $\pi/4$. In the embodiment of FIG. 5 with sixteen equal time steps this phase angle has a value of $\pi/8$. It can be seen from the table that in the example PSA the phase angle of FIG. 5 with a value of $\pi/8$ gives a lower variability of waste gas flowrate than the embodiment having twice as great a phase angle in FIG. 4. This variability in waste gas flowrate may be expressed as the amplitude of the continuous function resulting from the sum of the waste gas flowrate functions for the PSA cycles either in the time domain or in the polar coordinates discussed above. Mathematical techniques for minimizing the amplitude of combinations of such mathematical functions are known in the art.

Further, it is possible to select a phase angle between the two or PSA cycle which simultaneously minimizes more than one variable of interest. For example, the flowrate of waste gas and the flowrate of product gas, or the composition of some waste gas species and the total waste gas flowrate. Using the method of the present invention, it is also possible to maximize variation of some variable, such as concentration of some waste gas species, in order to capture a greater or lesser amount of that species as a second product directly or for subsequent purification. These diverse aims may be attained without making substantial alterations to the basic PSA apparatus or adversely impacting complexity.

FIG. 6 depicts a PSA apparatus for executing the process diagram of FIG. 3. The assembly 210 is used to connect to or house product manifold 2, and equalization and purge manifolds 4 and 5. The assembly 220 is used to connect to or house feed manifold 1 and waste manifold 3. The assembly 210 and the assembly 220 are preferably joined together by a plurality of rods as shown.

The present invention advantageously provides a flow variation suppression aspect. Flow between different pairs of vessels in the PSA is preferably equal for the execution of the same cycle steps. Thus, the provide purge 1 step, PP1, is executed between eight distinct pairings of vessels in the apparatus of the present invention. Inconsistencies in the flow characteristics between these eight pairings gives rise to variations in the degree to which various vessels are purged of adsorbed impurity species. This can result in an undesirable reduction in the fractional recovery of pure product gas from the PSA. In order to minimize unwanted flow variations, throttling assemblies 300 including throttling orifices 310 as depicted in FIGS. 7A, 7B, and 7C can be provided, for example, along the equalization and purge manifolds 4 and 5 or at locations between the vessels on the other manifolds. In one embodiment, the throttling assemblies may be used in place of the porous metal frits described in U.S. Pat. No. 6,887,301. Such orifices advantageously provide the pre-determined, desired flow characteristic with a minimum in variability. Unfortunately, it has been found that manufacturing variability can give rise to substantial differences in the flow characteristics of throttling orifices.

For example, in a group of throttling assemblies each with a single orifice, and with a mean orifice diameter of 0.095 inches with a standard deviation of about 0.003 inches, the standard deviation in flow was found to be large. However, in a group of throttling assemblies each with a single orifice, and with an orifice diameter of 0.095 inches with a standard deviation of 0.001 inches, the standard deviation in flow was about half of the first orifice example. This type of reduction in standard deviation may be obtained through greater care in manufacturing, such as careful reaming and deburring of drilled orifices, precision drilling of the orifices, or the use of wire EDM or other similar precision hole-making techniques. Such techniques may advantageously be used to limit the standard deviation in orifice diameter to as little as 0.0001". Thus, the present invention preferably includes a throttling assembly where a standard deviation in a diameter of each of the orifices is maintained at less than 2% of a mean orifice diameter, and a throttling assembly where a standard deviation in an orifice diameter in an array of orifices installed in the pressure swing adsorption system is less than 2% of a mean orifice diameter.

Furthermore, in a group of throttling assemblies each possessing an array of three orifices, and with each orifice having a diameter of 0.055 inches with a standard deviation of 0.001 inches, the standard deviation in flow was about one quarter of the first orifice example. Notably, this further reduction was obtained without an increase in the accuracy of manufacturing the orifices. Thus, for a given flow restriction required, it has been found that for equal manufacturing tolerances, an orifice assembly having at least two separate orifices is preferred over ones having a single orifice.

It should be noted that the exemplary embodiments depicted and described herein set forth the preferred embodiments of the present invention, and are not meant to limit the scope of the claims hereto in any way.

Numerous modifications and variation of the present invention are possible in light of the above teachings. It is therefore to be understood that, within the scope of the appended claims, the invention may be practiced otherwise than as specifically described herein.

What is claimed is:

1. A pressure swing adsorption system comprising:
a plurality of vessels each containing therein an adsorbent mass configured to separate a gas mixture by adsorbing at least one gas component in said adsorbent mass; and
a throttling assembly disposed in a fluid path between at least two of the plurality of vessels, the throttling assembly including at least two throttling orifices configured to regulate fluid flow between the at least two vessels, the at least two throttling orifices each penetrating a same obstruction,
wherein the system is configured to separate the gas mixture using a single pressure equalization cycle, and
wherein the system includes only four valves per vessel of the plurality of vessels.

2. The system according to claim 1, wherein the system includes four vessels.

3. The system according to claim 1, wherein the system includes eight vessels.

4. The system according to claim 1, further comprising four parallel flow manifolds including a feed manifold, a product manifold, a waste gas manifold, and an equalization and purge manifold,
wherein each vessel of the plurality of vessels is connected to each of said four parallel flow manifolds.

5. The system according to claim 4, wherein a single valve is provided along a conduit connecting each manifold of the four parallel flow manifolds to each respective vessel of the plurality of vessels.

6. The system according to claim 1, wherein the system is configured to separate the gas mixture using at least two independent pressure swing adsorption cycles, and wherein the independent pressure swing adsorption cycles are each performed in respective sets of vessels of the plurality of vessels.

7. The system according to claim 6, wherein each vessel of the plurality of vessels is connected to a common feed manifold, a common product manifold, and a common waste gas manifold, and wherein each set of vessels is connected to a separate equalization and purge manifold that is connected to each vessel within a respective set of vessels.

8. The system according to claim 6, wherein each set of vessels is identical to one another.

9. The system according to claim 6, wherein all of sets of vessels are provided in a single mechanical assembly.

10. The system according to claim 6, wherein a controller is configured to cause each set of vessels to perform a same series of steps in the at least two independent pressure swing adsorption cycles, and the controller causes a timing of cycles to be offset by a predetermined phase angle.

11. A pressure swing adsorption system comprising:
a plurality of vessels each containing therein an adsorbent mass configured to separate a gas mixture by absorbing at least one gas component in said adsorbent mass; and
a throttling assembly disposed in a fluid path between at least two of the plurality of vessels, the throttling assembly including at least two throttling orifices configured to regulate fluid flow between the at least two vessels,
wherein the system is configured to separate the gas mixture using a single pressure equalization cycle, and
wherein the system includes only four valves per vessel of the plurality of vessels,
wherein the system is configured to separate the gas mixture using at least two independent pressure swing adsorption cycles, and wherein the independent pressure swing adsorption cycles are each performed in respective sets of vessels of the plurality of vessels,
wherein a controller is configured to cause each set of vessels to perform a same series of steps in the at least two independent pressure swing adsorption cycles, and the controller causes a timing of cycles to be offset b a predetermined phase angle, and
wherein the controller is configured to vary the predetermined phase angle to minimize a predetermined variable including at least one of a total flowrate of waste gas, a composition of waste gas species, and a total flowrate of product gas.

12. Previously Presented): The system according to claim 11, wherein the predetermined phase angle is varied by the controller to simultaneously minimize more than one predetermined variable.

13. A pressure swing adsorption system comprising:
a plurality of vessels each containing therein an adsorbent mass configured to separate a gas mixture by absorbing at least one gas component in said adsorbent mass; and
a throttling assembly disposed in a fluid path between at least two of the plurality of vessels, the throttling assembly including at least two throttling orifices configured to regulate fluid flow between the at least two vessels,
wherein the system is configured to separate the gas mixture using a single pressure equalization cycle, and
wherein the system includes only four valves per vessel of the plurality of vessels,
wherein the system is configured to separate the gas mixture using at least two independent pressure swing adsorption cycles, and wherein the independent pressure swing adsorption cycles are each performed in respective sets of vessels of the plurality of vessels,
wherein a controller is configured to cause each set of vessels to perform a same series of steps in the at least two independent pressure swing adsorption cycles, and the controller causes a timing of cycles to be offset by a predetermined phase angle, and
wherein the predetermined phase angle is varied by the controller to maximize a predetermined variable including a concentration of waste gas species.

14. The system according to claim 10, wherein the controller causes durations of time in the steps of the series of steps to be equal.

15. The system according to claim 10, wherein the controller causes durations of time in the steps of the series of steps to be unequal.

16. The system according to claim 6, further comprises means for minimizing a predetermined variable including at least one of a total flowrate of waste gas, a composition of waste gas species, and a total flowrate of product gas.

17. The system according to claim 16, wherein the means for minimizing includes means for simultaneously minimizing more than one predetermined variable.

18. The system according to claim 6, further comprises means for maximizing a predetermined variable including a concentration of waste gas species.

19. The system according to claim 6, further comprising means for minimizing variations in product gas flowrate and waste gas flowrate independently.

20. The system according to claim 6, further comprising means for minimizing variation in product gas flowrate and waste gas flowrate simultaneously.

21. A pressure swing adsorption system comprising:
a plurality of vessels each containing therein an adsorbent mass configured to separate a gas mixture by absorbing at least one gas component in said adsorbent mass; and
a throttling assembly disposed in a fluid path between at least two of the plurality of vessels, the throttling assembly including at least two throttling orifices configured to regulate fluid flow between the at least two vessels, the at least two throttling orifices each penetrating a same obstruction,
wherein the system is configured to separate the gas mixture using at least two independent pressure swing adsorption cycles, and
wherein the at least two independent pressure swing adsorption cycles are each performed in respective sets of vessels of the plurality of vessels.

22. The system according to claim 21, wherein the system includes only four valves per vessel of the plurality of vessels
wherein the system is configured to separate the gas mixture using a single pressure equalization cycle.

23. The system according to claim 21, wherein each vessel of the plurality of vessels is connected to a common feed manifold, a common product manifold, and a common waste gas manifold, and wherein each set of vessels is connected to a separate equalization and purge manifold that is connected to each vessel within a respective set of vessels.

24. The system according to claim 21, wherein each set of vessels is identical to one another.

25. The system according to claim 21, wherein all of sets of vessels are provided in a single mechanical assembly.

26. The system according to claim 21, wherein a controller is configured to cause each set of vessels to perform a same series of steps in the at least two independent pressure swing adsorption cycles, and wherein the controller causes a timing of cycles to be offset by a predetermined phase angle.

27. A pressure swing adsorption system comprising:
a plurality of vessels each containing therein an adsorbent mass configured to separate a gas mixture by absorbing at least one gas component in said adsorbent mass; and
a throttling assembly disposed in a fluid path between at least two of the plurality of vessels, the throttling assembly including at least two throttling orifices configured to regulate fluid flow between the at least two vessels,
wherein the system is configured to separate the gas mixture using at least two independent pressure swing adsorption cycles,
wherein the at least two independent pressure swing adsorption cycles are each performed in respective sets of vessels of the plurality of vessels,
wherein a controller is configured to cause each set of vessels to perform a same series of steps in the at least two independent pressure swing adsorption cycles, and wherein the controller causes a timing of cycles to be offset by a predetermined phase angle, and wherein the controller is configured to vary the predetermined phase angle to minimize a predetermined variable including at least one of a total flowrate of waste gas, a composition of waste gas species, and a total flowrate of product gas.

28. The system according to claim 27, wherein the predetermined phase angle is varied by the controller to simultaneously minimize more than one predetermined variable.

29. A pressure swing adsorption system comprising:
a plurality of vessels each containing therein an adsorbent mass configured to separate a gas mixture by absorbing at least one gas component in said adsorbent mass; and
a throttling assembly disposed in a fluid path between at least two of the plurality of vessels, the throttling assembly including at least two throttling orifices configured to regulate fluid flow between the at least two vessels
wherein the system is configured to separate the gas mixture using at least two independent pressure swing adsorption cycles,
wherein the at least two independent pressure swing adsorption cycles are each performed in respective sets of vessels of the plurality of vessels,
wherein a controller is configured to cause each set of vessels to perform a same series of steps in the at least two independent pressure swing adsorption cycles, and wherein the controller causes a timing of cycles to be offset by a predetermined phase angle, and
wherein the predetermined phase angle is varied by the controller to maximize a predetermined variable including a concentration of waste gas species.

30. The system according to claim 26, wherein the controller causes durations of time in the steps of the series of steps to be equal.

31. The system according to claim 26, wherein the controller causes durations of time in the steps of the series of steps to be unequal.

32. The system according to claim 21, further comprises means for minimizing a predetermined variable including at least one of a total flowrate of waste gas, a composition of waste gas species, and a total flowrate of product gas.

33. The system according to claim 32, wherein the means for minimizing includes means for simultaneously minimizing more than one predetermined variable.

34. The system according to claim 32, further comprising means for maximizing a predetermined variable including a concentration of waste gas species.

35. The system according to claim 21, further comprising means for minimizing variation in product gas flowrate and waste gas flowrate independently.

36. The system according to claim 21, further comprising means for minimizing variation in product gas flowrate and waste gas flowrate simultaneously.

37. A throttling assembly fora pressure swing adsorption system including at least two vessels each containing therein an adsorbent mass configured to separate a gas mixture by absorbing at least one gas component in the adsorbent mass, said throttling assembly comprising:
at least two throttling orifices configured to regulate flow between the at least two vessels, the at least two throttling orifices each penetrating a same obstruction, and where a standard deviation in a diameter of each of the orifices is maintained at less than 2% of a mean orifice diameter.

38. A throttling assembly for a pressure swing adsorption system including at least two vessels each containing therein an adsorbent mass configured to separate a gas mixture by absorbing at least one gas component in the adsorbent mass, said throttling assembly comprising;
at least two throttling orifices configured to regulate flow between the at least two vessels, the at least two throttling orifices each penetrating a same obstruction, and where a standard deviation in an orifice diameter in an array of orifices installed in the pressure swing adsorption system is less than 2% of a mean orifice diameter.

39. A pressure swing adsorption apparatus comprising:
at least two pairs of vessels in fluid communication, with at least one throttling assembly interposed in a fluid path between each pair of vessels, wherein the throttling assembly includes at least two orifices, the at least two orifices each penetrating a same obstruction.

40. The throttling assembly of claim 37, wherein at least one of the at least two throttling orifices is circular.

41. The throttling assembly of claim 40, wherein all of the at least two throttling orifices are circular.

42. The throttling assembly of claim 39, wherein at least one of the at least two orifices is circular.

43. The throttling assembly of claim 39, wherein all of the at least two orifices are circular.

* * * * *

UNITED STATES PATENT AND TRADEMARK OFFICE
CERTIFICATE OF CORRECTION

PATENT NO. : 8,034,164 B2  Page 1 of 1
APPLICATION NO. : 12/239383
DATED : October 11, 2011
INVENTOR(S) : Lomax, Jr. et al.

It is certified that error appears in the above-identified patent and that said Letters Patent is hereby corrected as shown below:

Column 9:

Line 29, delete "Previously Presented):".

Column 12:

Line 7, delete "fora" and insert --for a--.

Signed and Sealed this
Third Day of January, 2012

David J. Kappos
*Director of the United States Patent and Trademark Office*